United States Patent
Choi et al.

(10) Patent No.: US 7,591,867 B2
(45) Date of Patent: Sep. 22, 2009

(54) VENTILATION SYSTEM

(75) Inventors: Keun Hyoung Choi, Seoul (KR); Jeong Yong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 11/147,379

(22) Filed: Jun. 8, 2005

(65) Prior Publication Data

US 2006/0174596 A1   Aug. 10, 2006

(30) Foreign Application Priority Data

Feb. 7, 2005   (KR) .................. 10-2005-0011268

(51) Int. Cl.
*B01D 53/94* (2006.01)
*F24F 7/007* (2006.01)

(52) U.S. Cl. .................. 55/385.2; 55/471; 55/472; 55/473; 454/187; 454/230; 454/232; 454/237; 454/246; 454/248

(58) Field of Classification Search ............... 55/385.2, 55/471–473; 454/187, 230, 232, 237, 246, 454/248
See application file for complete search history.

(56) References Cited

U.S. PATENT DOCUMENTS

| | | | | |
|---|---|---|---|---|
| 5,417,610 A | * | 5/1995 | Spransy | 454/187 |
| 5,958,114 A | * | 9/1999 | Sunahara et al. | 96/417 |
| 5,964,910 A | * | 10/1999 | Keele | 55/385.1 |
| 6,033,301 A | * | 3/2000 | Suwa | 454/187 |
| 6,244,954 B1 | * | 6/2001 | Hosokawa et al. | 454/315 |
| 2001/0049927 A1 | * | 12/2001 | Toepel | 55/385.2 |
| 2003/0064676 A1 | * | 4/2003 | Federspiel | 454/75 |
| 2005/0160706 A1 | * | 7/2005 | Kim et al. | 55/385.2 |
| 2007/0113527 A1 | * | 5/2007 | Song et al. | 55/471 |
| 2007/0144119 A1 | * | 6/2007 | Bauer | 55/385.2 |

FOREIGN PATENT DOCUMENTS

| | | | |
|---|---|---|---|
| JP | 08-089566 | | 4/1996 |
| JP | 11-201510 | | 3/1999 |
| JP | 11-211164 | | 8/1999 |
| JP | 2001-248865 | * | 9/2001 |
| JP | 2004-162955 | | 6/2004 |
| KR | 10-2005-0112846 A | | 12/2005 |

* cited by examiner

*Primary Examiner*—Duane Smith
*Assistant Examiner*—Minh-Chau T Pham
(74) *Attorney, Agent, or Firm*—Birch, Stewart, Kolasch & Birch, LLP

(57) ABSTRACT

The present invention provides a compact ventilation system provided with an air purifying function. The present invention includes a case having at least one inlet and outlet communicating with an indoor space, an air supply duct connected to the case to allow the case to communicate with an outdoor environment, a fan provided within the case, the fan sucking air introduced into the case via the air supply duct, the fan blowing out the sucked air to the at least one outlet, an air guide provided within the case to guide the air introduced into the case to the fan and to guide the air blown from the fan to the at least one outlet, and an air purifying member situated next to a lateral side of the fan between the fan and the at least one outlet to purify the air blown from the fan.

13 Claims, 5 Drawing Sheets

VENTILATION SYSTEM

This application claims the benefit of the Korean Application No. P2005-0011268 filed on Feb. 7, 2005, which is hereby incorporated by reference.

BACKGROUND OF THE INVENTION

1. Field of the Invention

The present invention relates to a ventilation system, and more particularly, to a compact ventilation system provided with an air purifying function.

2. Discussion of the Related Art

Generally, air in an airtight room is gradually polluted by human respiration acting therein as time goes by. Hence, the polluted air in the room needs to be frequently replaced by outdoor fresh air, which is carried out by a ventilation system. The ventilation system is generally installed within a ceiling of a room. For installation of the ventilation system, a sufficient space needs to be secured between a room ceiling and a bottom of an upper floor. A distance, i.e., a floor height between bottoms of upper and lower floors is inevitably raised, which lowers spatial and economical efficiency of a building.

Recently, to improve indoor living environment, an air purifier purifying indoor air is used together with the ventilation system. In this case, additional expense for purchasing the air purifier is needed.

However, if the ventilation system and the air purifier are separately provided to the room, polluted outdoor air introduced by the ventilation system in ventilating the room may be directly supplied to the room to have difficulty in providing pleasant indoor environment.

SUMMARY OF THE INVENTION

Accordingly, the present invention is directed to a ventilation system that substantially obviates one or more problems due to limitations and disadvantages of the related art.

An object of the present invention is to provide a ventilation system, in which a configuration of the ventilation system is modified and by which a floor height of a building is not raised to install the ventilation system.

Another object of the present invention is to provide a ventilation system, by which outdoor air supplied to a room in ventilation is purified as well as indoor air.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilation system according to the present invention includes a case having at least one inlet and outlet communicating with an indoor space, an air supply duct connected to the case to allow the case to communicate with an outdoor environment, a fan provided within the case, the fan sucking air introduced into the case via the air supply duct, the fan blowing out the sucked air to the at least one outlet, an air guide provided within the case to guide the air introduced into the case to the fan and to guide the air blown from the fan to the at least one outlet, and an air purifying member situated next to a lateral side of the fan between the fan and the at least one outlet to purify the air blown from the fan.

Preferably, the fan sucks the air in an axial direction and blows the air in a radial direction.

Preferably, the at least one inlet is provided to a center of a bottom of the case and the at least one or more outlets are arranged next to both sides of the at least one outlet, respectively.

Preferably, the air guide encloses the inlet to isolate the outlet from the inlet and is provided with an opening allowing the inlet to communicate with the fan.

Preferably, the air purifying member is installed slant.

Preferably, the fan is installed to suck the air introduced into the case via a lower part and to blow the sucked air via both lateral sides and the air purifying member is obliquely arranged next to both lateral sides of the fan.

Preferably, the ventilation further includes a louver provided to the case to open/close the at least one inlet.

Preferably, the air supply duct is connected to a lateral side of the case to communicate with the fan and the at least one inlet.

Preferably, the ventilation system further includes a damper selectively opening/closing the air supply duct.

Preferably, the ventilation system further includes an additional inlet provided to the case, a partition plate provided within the case to partition a space within the case into a space communicating with the additional inlet and a space isolated from the additional inlet, and an exhaust duct connected to the case to allow the additional inlet to communicate with the outdoor environment.

More preferably, the ventilation system further includes an exhaust fan provided within the exhaust duct to suck indoor air via the additional inlet and to discharge the sucked indoor air to the outdoor environment via the exhaust duct.

More preferably, the ventilation system further includes a total heat exchanger separately connected to the air supply duct and the exhaust duct to exchange heat between outdoor air flowing through the air supply duct and indoor air flowing through the exhaust duct.

In another aspect of the present invention, a ventilation system includes a case having at least one inlet and outlet provided to a bottom of the case, an air supply duct connected to the case to allow the case to communicate with an outdoor environment, a fan provided over the at least one inlet within the case, the fan sucking air introduced into the case via the at least one inlet or the air supply duct, the fan blowing out the sucked air to the at least one outlet, an air guide under the fan to isolate the at least one outlet from the at least one inlet and the air supply duct, the air guide having an opening allowing the at least one inlet to communicate with the air supply duct, and an air purifying member situated next to a lateral side of the fan between the fan and the at least one outlet to purify the air blown from the fan.

Preferably, the outlets are situated at both sides of the at least one inlet, respectively and the air purifying member is situated next to both sides of the fan.

Preferably, the air purifying member is installed slant.

Preferably, the air purifying member obliquely extends from the air guide to a top surface of the case.

Preferably, the ventilation further includes a damper selectively opening/closing the air supply duct.

Preferably, the air guide is installed to enclose the at least one inlet and the air supply duct is installed to communicate with a space defined by the air guide.

Preferably, the ventilation system further includes an additional inlet provided to the case, a partition plate provided within the case to partition a space within the case into a space communicating with the additional inlet and a space isolated from the additional inlet, and an exhaust duct connected to the case to allow the additional inlet to communicate with the outdoor environment.

In a further aspect of the present invention, a ventilation system includes a case, a first space provided within the case to communicate with an indoor space and an outdoor environment, an air supply duct connected to the case to allow the first space to communicate with the outdoor environment and to introduce outdoor air into the first space, a second space provided within the case to communicate with the indoor space and the first space, a fan provided over the first space, the fan sucking air of the first space via a lower part of the fan, the fan blowing the sucked air in a lateral direction to supply to the indoor space via the second space, and an air purifying member provided next to a lateral side of the fan within the second space to purify the air blown from the fan to be supplied to the indoor space.

Preferably, the ventilation system further includes a third space provided within the case to be isolated from the first and second spaces and to communicate with the indoor space and an exhaust duct connected to the case to allow the third space to communicate with the outdoor environment and to discharge indoor air to the outdoor environment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
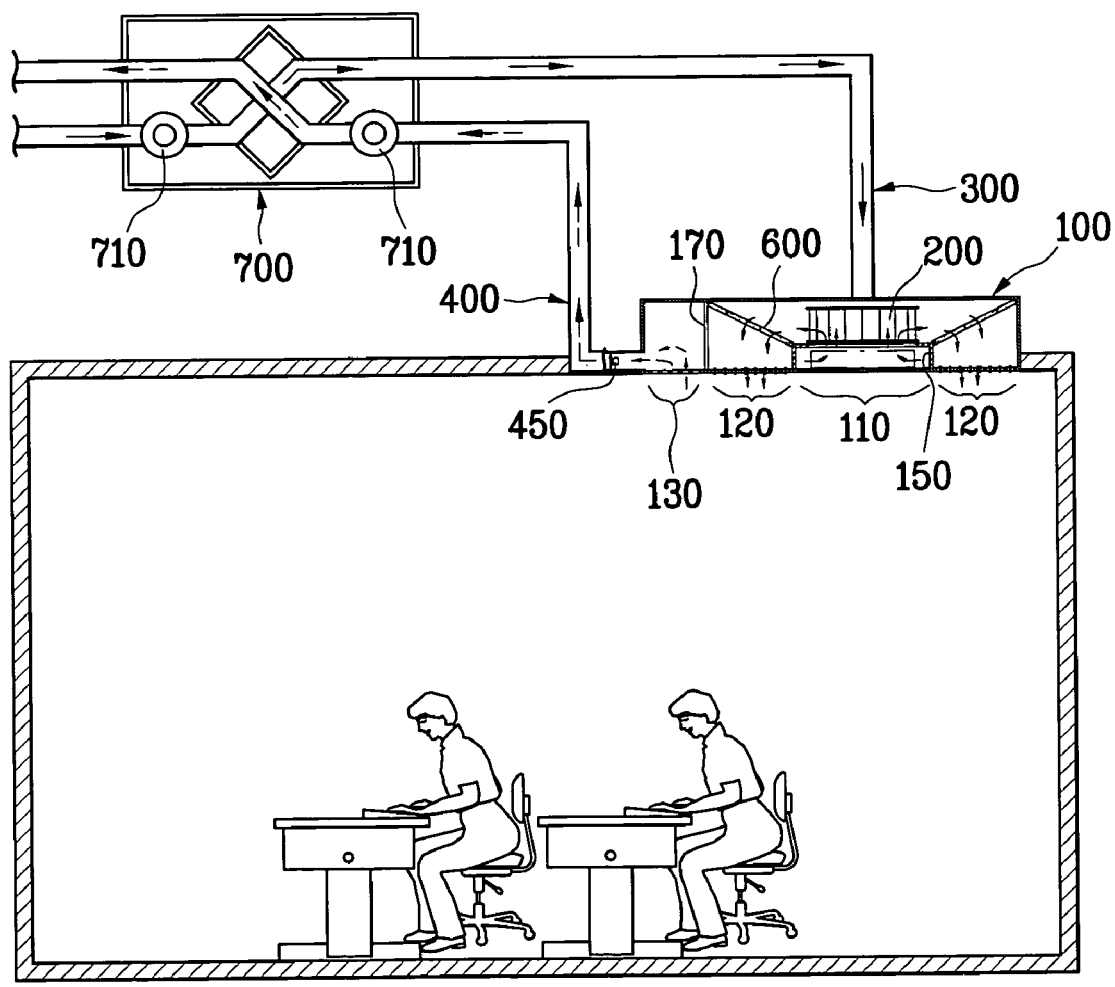
FIG. 1 is a diagram of a ventilation system according to the present invention.

A case 100 of a ventilation system according to the present invention, by which an indoor space communicates with an outdoor environment, as shown in FIG. 1, is built in a ceiling. A bottom surface of the case 100 substantially lies on the same plane of the ceiling of the indoor space. And, at least one or more inlets 110 and outlets 120 communicating with the indoor space are provided to the bottom surface of the case 100.

The inlet 110, which is to introduce polluted indoor air into the case 100, as shown in FIGS. 2 to 5, is provided to a central part of the bottom surface of the case 100 for example. The inlet 110 includes a plurality of slots making the indoor space communicate with an inside of the case 100. A louver 115 is provided to each of the slots to open/close. Hence, the inlet 110 is opened or closed by the louvers 115.

The outlets 120, which are to supply the air introduced into the case 100 or outdoor air to the indoor space, as shown in FIGS. 2 to 5, are provided to both sides of the inlet 110 provided to the center of the bottom of the case 100, respectively. Each of the outlets 120 includes a multitude of elongated apertures making the indoor space and the inside of the case 100 communicate with each other. And, a guide vane 125 is provided to each of the apertures. The guide vane 125 decides a direction of air supplied to the indoor space from the case 100 so that the air within the case 100 can be supplied to every corner of the indoor space by the guide vane 125.

Figure 2:
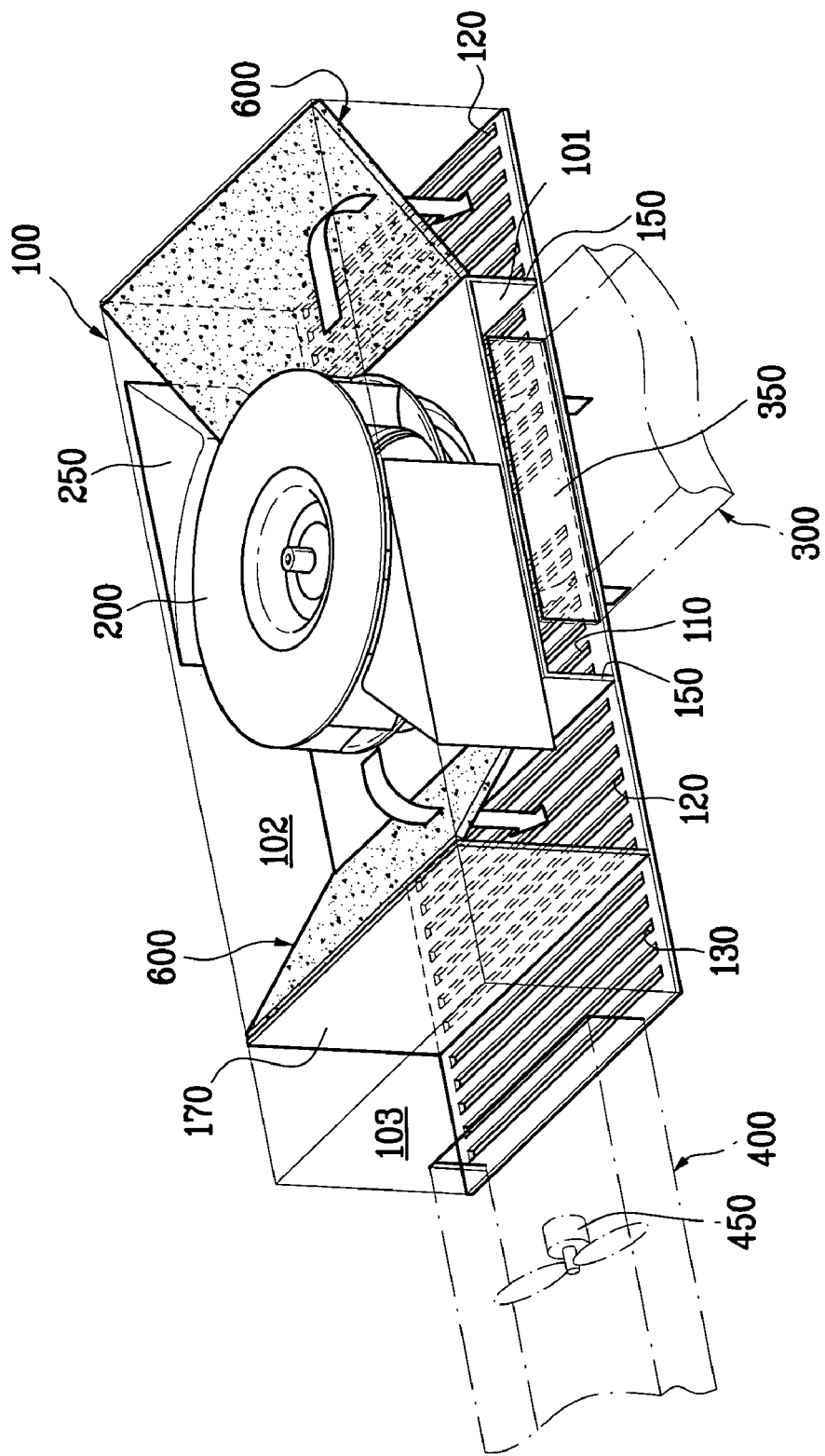
FIG. 2 is a perspective diagram for showing a flow of air in purifying indoor air by the ventilation system in FIG. 1.
Figure 3:
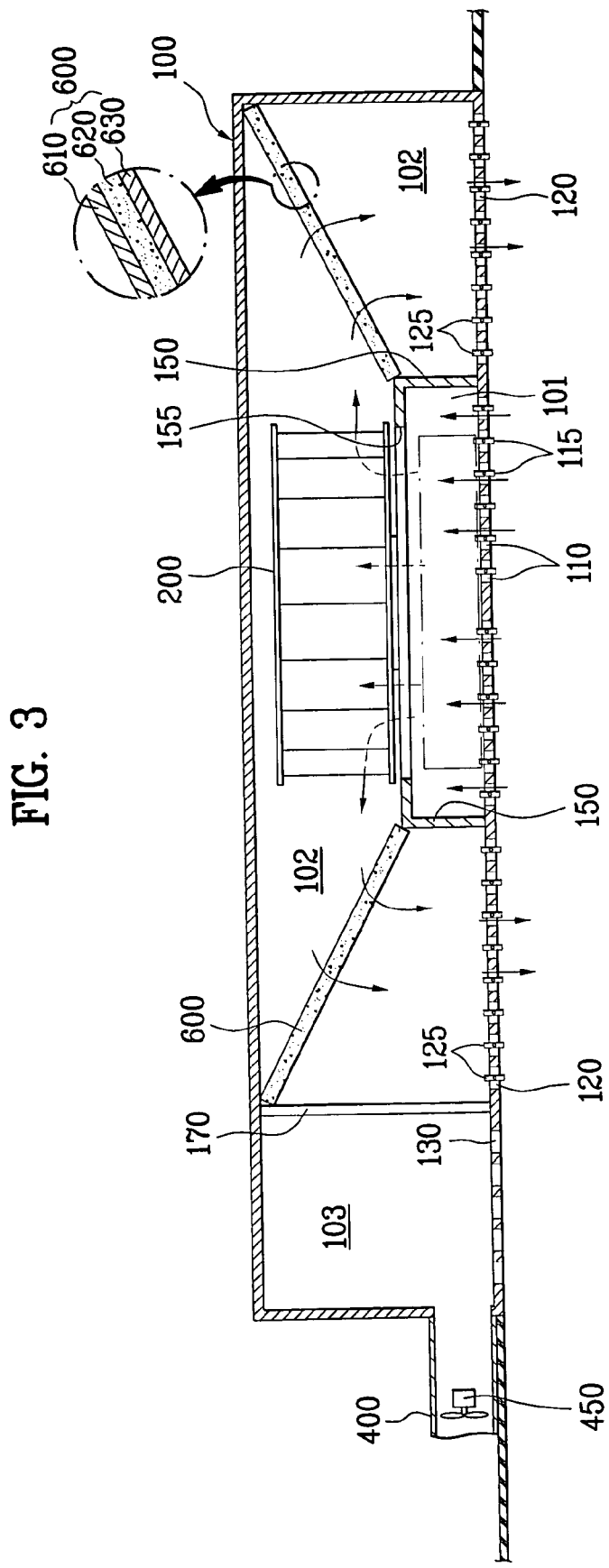
FIG. 3 is a cross-sectional diagram for showing a flow of air in purifying indoor air by the ventilation system in FIG. 1.
Figure 4:
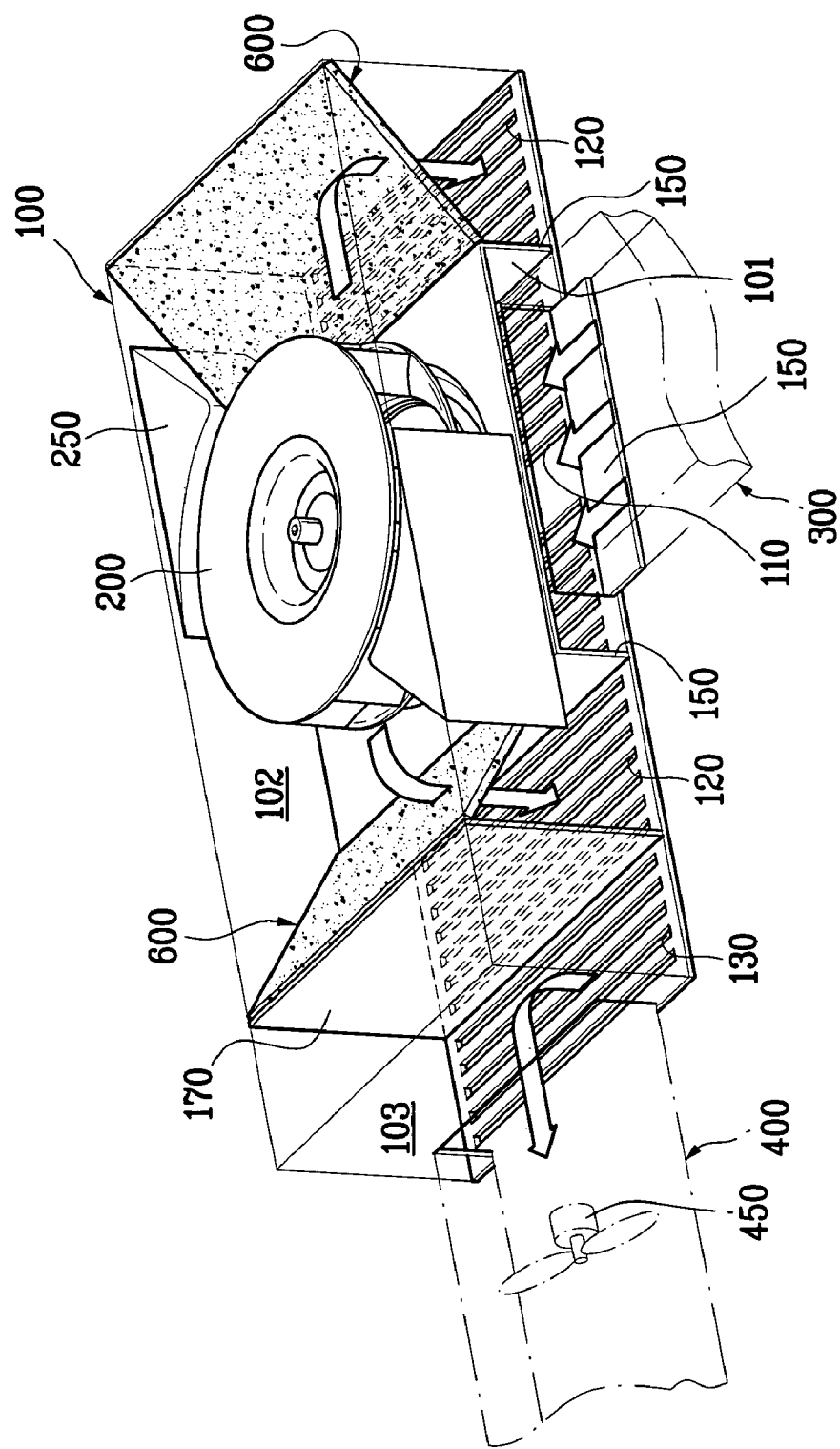
FIG. 4 is a perspective diagram for showing a flow of air in ventilating a room by the ventilation system in FIG. 1.

An air supply duct 300 is connected to the case 100 to communicate the indoor space with the outdoor environment and to introduce the outdoor air into the case 100. The air supply duct 300, as shown in FIGS. 2 to 4, is connected to a lower lateral side of the case 100 and communicates with the inlet 110 within the case 100. A damper 350 can be provided inside the air supply duct 300 or to a part where the case 100 and the air supply duct 300 are connected to each other. The damper 350, as shown in FIGS. 2 to 4, selectively opens or closes the air supply duct 300 to introduce the outdoor air into the case 100 or to prevent the outdoor air from being introduced into the case 100.

A fan 200 is provided within the case 100 to blow the air introduced into the case 100 via the air supply duct 300 toward the outlet 120. The fan 200 can be configured to suck the air in an axial direction and to blow the sucked air in a radial direction for example. The fan 200, as shown in FIGS. 2 to 4, is situated at an upper part within the case 100, and more specifically, over the inlet 110. And, the fan 200 sucks the air introduced into the case 100 and then blows the sucked air in the radial direction via a lower side. In this case, a scroll casing 250 is provided to a circumference of the fan 200 to guide a flow of the air blown from the fan 200. Hence, the air blown in the radial direction of the fan 200 is guided to the outlets 120 provided to both sides of the inlet 110 by the scroll casing 250.

An air guide 150 is provided within the case 100 to prevent the air introduced into the case 100 from being mixed with the air blown outside the case 100 by guiding the air introduced into the case 100 to the fan 200 and by guiding the air blown from the fan 200 to the outlet 120. The air guide 150, as shown in FIGS. 2 to 4, encloses the inlet 110 provided to the center of the bottom of the case 100 to isolate the outlets 120 from the inlet 110. Hence, an inner space of the case 100 is partitioned into a first space 101 communicating with the inlet 110 and a second space 102 communicating with the outlets 120 by the air guide 150.

Specifically, the first space 101 is provided to a lower inner central part of the case 100, communicates with the outdoor environment via the air supply duct 300, and communicates with the indoor space via the inlet 110. And, the second space, 102, which is provided to an inner upper part of the case 100 and both sides of the first space 101, encloses lateral and upper sides of the first space 101. Moreover, the second space 102 communicates with the indoor space via the outlet 120 and receives the fan 200 inside. The first and second spaces 101 and 102, as shown in FIGS. 3 to 5, communicate with each other via an opening 155 provided to the air guide 150, and the fan 200 sucks the air within the first space 101 via the opening 155 and then blows the sucked air into the second space 102.

An air purifying member 600 is provided within the case 100, and more specifically, to the second space 102. The air purifying member 600 is provided between the fan 200 and the outlet 120, is arranged to a lateral side of the fan 200, and purifies the air which was blown by the fan 300 to be supplied to the indoor space via the outlet 120. Hence, the ventilation system according to the present invention supplies clean air purified by the air purifying member 600 to the indoor space only, thereby providing pleasant indoor environment without using a separate air purifier.

The air purifying member 600, as shown in FIGS. 1 to 5, is provided to both lateral sides of the fan 200. With such a configuration, a height of the case 100 needs not to be raised to install the air purifying member 600, whereby a compact size of the case 100 is enabled. Furthermore, the air purifying member 600 is installed to slant against the fan 200 rather than to be vertical to the fan 200. Specifically, the air purifying member 600, as shown in FIGS. 2 to 5, is installed to slant from the air guide 150 to an upper surface of the case 100. With such a configuration, a filtering area of the air purifying member 600 filtering the air blown from the fan 200 is increased, whereby air purifying capability of the ventilation system can be considerably raised.

Figure 5:
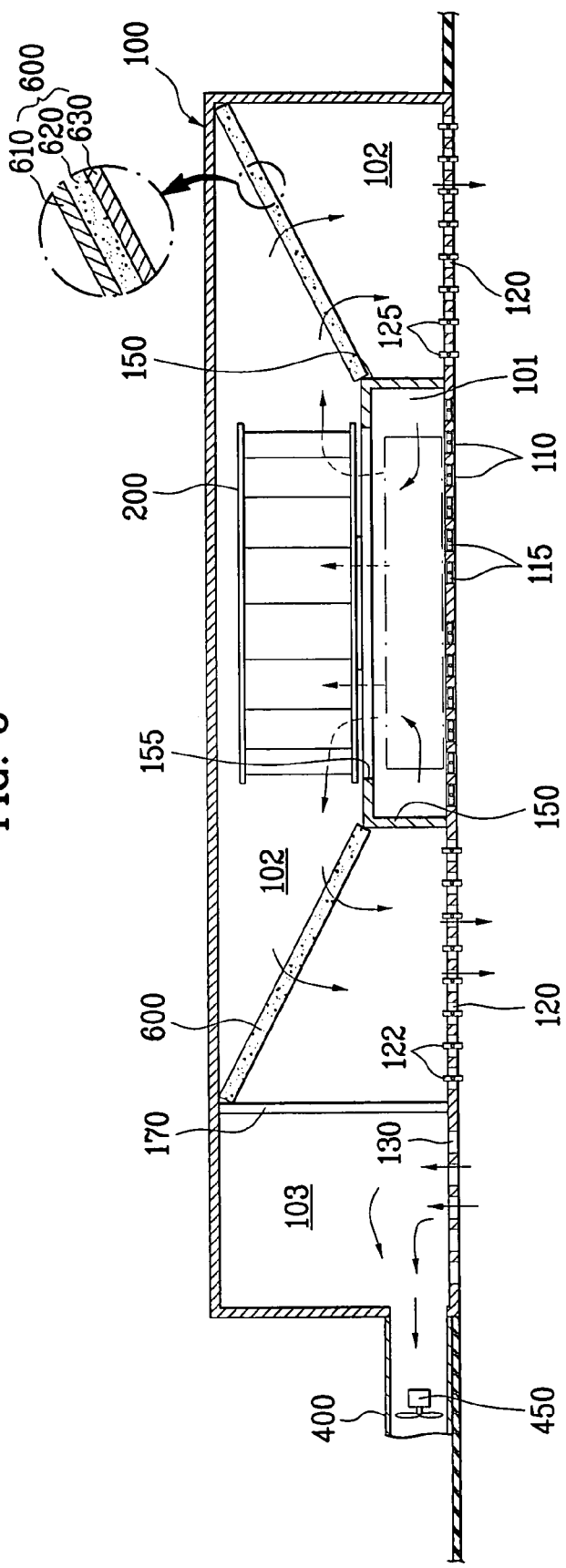
FIG. 5 is a cross-sectional diagram for showing a flow of air in ventilating a room by the ventilation system in FIG. 1.

The air purifying member 600, as shown in FIGS. 3 to 5, includes a high-performance dust-collecting filter 610, a photocatalyst 620 and an active carbon 630. The high-performance dust-collecting filter 610 is to filter off dust and the like from the air. And, the photocatalyst 620 and the active carbon 630 are substances having strong adsorption power to remove micro odors and particles from the air. HEPA (high efficiency particulate arrestor) filter or ULPA (ultra low penetration absolute) filter can be used as the high-performance dust-collecting filter 610.

In this case, the HEPA filter has purifying capability of eliminating 99% of particles including dust below 0.3 micron, bacteria, virus, etc. And, the ULPA filter has purifying capability of eliminating 99% of particles including microscopic dust of 0.1~0.1 micron, bacteria, virus, dandruff, mold, pollen, disintegration product of radon (Rd), various kinds of smoke, etc. The photocatalyst is a sort of catalyst, by which catalysis occurs with photoenergy. $TiO_2$, $ZnO$, $CdS$, $ZrO_2$, $SnO_2$, $V_2O_2$, $WO_3$ or the like is used as the photocatalyst.

The above-configured ventilation system according to the present invention purifies indoor air or introduces outdoor air into an indoor space. For instance, while the damper 350 closes the air supply duct 300 and the louver 115 opens the inlet 110, if the fan 200 is driven, the indoor air, as shown in FIG. 2 and FIG. 3, is introduced into the case 100 via the inlet 110 and is re-supplied to the indoor space via the air purifying member 600 and the outlet 120. Thus, the ventilation system sucks the polluted indoor air, purifies the sucked-in air, and then re-supplies the purified air to the indoor space.

On the other hand, while the damper 350 opens the air supply duct 300 and the louver 115 closes the inlet 110, if the fan 200 is driven, the outdoor air, as shown in FIG. 4 and FIG. 5, is introduced into the case 100 via the air supply duct 300 and is supplied to the indoor space via the air purifying member 600 and the outlet 120. Thus, the ventilation system supplies the outdoor air more pleasant than the polluted indoor air to the indoor space, thereby ventilating the indoor space.

Yet, in case that the outdoor air is introduced into the indoor space to ventilate only, ventilation efficiency is lowered and ventilation time is extended. Hence, the ventilation system according to the present invention can be further provided with elements for discharging the polluted indoor air outside in indoor ventilation, which is explained in detail as follows.

An additional inlet 130, as shown in FIGS. 2 to 5, is provided to the case 100. Specifically, the additional inlet 130 is provided to the bottom of the case 100 adjacent to the outlet 120. A partition plate 170 is provided within the case 100 to isolate the additional inlet 130 from the outlet 120. A lower end of the partition plate 170 is situated between the outlet 120 and the additional inlet 130 and an upper end of the partition plate 170 is connected to a top surface of the case 100. Hence, the partition plate 170 can provide a third space 103, which is isolated from the first and second spaces 101 and 102, within the case 100.

The third space 103 defined by an inside of the case 100 and the partition plate 170 communicates with the indoor space via the additional inlet 130 and further communicates with the outdoor environment via an exhaust duct 400 connected to a lateral side of the case 100. An exhaust fan 450 can be provided within the exhaust duct 400. If the exhaust fan 450 is driven, the indoor air is discharged to the outdoor environment via the additional inlet 130, the third space 103 and the exhaust duct 400.

In the above example, the additional inlet 130 and the partition plate 170 are provided to the case 100 and the exhaust duct 400 is connected to the case 100 to form an exhaust passage. Yet, the exhaust passage can be differently modified. For instance, the exhaust duct can be installed separate from the case 100 to make the indoor space communicate with the outdoor environment.

The ventilation system according to the present invention, as shown in FIG. 1, can be provided with a total heat exchanger 700 to which the air supply duct 300 and the exhaust duct 400 are respectively connected. The total heat exchanger 700 includes a multitude of first passages communicating with the air supply duct 300 to allow the outdoor air to flow therein and a multitude of second passages communicating with the exhaust 400 to allow the indoor air to flow therein. In this case, the second passages are provided between the first passages and a plate is provided between the first and second passages. Hence, within the total heat exchanger 700, heat is indirectly exchanged between the outdoor air supplied to the indoor space via the air supply duct 300 and the indoor air discharged to the outdoor environment via the exhaust duct 400. Accordingly, heat energy of the indoor air discharged to the outdoor environment is recovered by the outdoor air supplied to the indoor space, whereby thermal efficiency of the ventilation system is raised.

Meanwhile, auxiliary fans 710, as shown in FIG. 1, can be further provided to the total heat exchanger 710. The auxiliary fans 710 are provided to the air supply duct 300 and the exhaust duct 400, respectively to help the indoor and outdoor air pass through the total heat exchanger 700 smoothly.

The above-configured ventilation system according to the present invention is operated in a first mode for purifying the indoor air or a second mode for ventilating the indoor space.

In operating the ventilation system, as shown in FIG. 2 and FIG. 3, in the first mode, the damper 350 closes the air supply duct 300, the louver 115 opens the inlet 110 of the case 100, and the exhaust fan 450 is not driven in general. Once the fan 200 is driven, the polluted air in the indoor space is introduced into the first space 101 within the case 100 via the inlet 110 provided to the center of the bottom of the case 100. The fan 200 situated over the first space 101 sucks the indoor air introduced into the first space 101 via the opening 155 and then blows the sucked air into the second space 102. The indoor air blown from the fan 200 passes through the air purifying member 600 tilted between the fan 200 and the outlet 120 to be filtered. The filtered air is then supplied to the indoor space via the outlets 120 provided to the bottom of the case 100. In doing so, the purified air can be supplied to each corner of the indoor space by the guide vanes 125 provided to the outlets 120, respectively.

In operating the ventilation system, as shown in FIG. 4 and FIG. 5, in the second mode, the damper 350 opens the air supply duct 300, the louver 115 closes the inlet 110 of the case 100, and the fan 200 within the case 100 and the exhaust fan 450 are driven together. First of all, once the fan 200 is driven, the outdoor air is introduced into the first space 101 within the case 100 via the air supply duct 300. The fan 200 sucks the outdoor air introduced into the first space 101 via the opening 155 and then blows the sucked air into the second space 102. The outdoor air blown from the fan 200 passes through the air purifying member 600 to be purified and is then supplied to the indoor space via the outlet 120.

Meanwhile, once he exhaust fan 450 is driven, the polluted air in the indoor space is introduced into the third space 103 via the additional inlet 130 provided to the bottom of the case 100. In doing so, since the partition plate 170 isolates the third space 103 from the first and second spaces 101 and 102, the indoor air introduced into the case 100 via the additional inlet 130 is not mixed with the outdoor air flowing within the first or second space 101 or 102. The indoor air introduced into the third space 103 is discharge to the outdoor environment via the exhaust duct 400.

In operating the ventilation system in the second mode, heat exchange is indirectly performed between the indoor air discharged to the outdoor environment and the outdoor air supplied to the indoor space in the total heat exchanger 700. Hence, since a temperature difference between the indoor space and the outdoor environment considerably exists in summer or winter, considerable amount of heat energy can be recovered via the total heat exchanger 700.

As explained in the foregoing description, the present invention is capable of ventilating the indoor space or purifying the indoor air using one unit thereby reduce the purchase expense of the instrument for ventilation and air purification.

And, the air purifying member of the ventilation system according to the present invention is installed at the lateral side of the fan to secure the installation height of the air purifying member as good as the height of the fan. Therefore, the height for installing the air purifying member within the case is not separately needed, whereby the height of the case can be lowered and a compact size of the case is enabled. Hence, a floor height of a building can be lowered to reduce initial construction costs for the building, whereby the numbers of floors of the same building height can be raised to maximize spatial efficiency.

Moreover, since the air purifying member is installed within the case, thereby supplying fresher indoor and outdoor air to the indoor space.

Furthermore, as the air purifying member is installed slant, the air filtering area of the air purifying member is increased to considerably enhance air purifying capacity of the ventilation system.

It will be apparent to those skilled in the art that various modifications and variation can be made in the present invention. Thus, it is intended that the present invention covers the modifications and variations of this invention provided they come within the scope of the appended claims and their equivalents.

What is claimed is:

1. A ventilation system comprising:
   a case having at least one inlet and two outlets communicating with an indoor space, the case being mounted on a ceiling of a room, the inlet and the outlet being provided on a bottom surface of the case, and the inlet arranged between the two outlets;
   an air guide to enclose the inlet and define a first space therein and a second space thereout, the air guide having an opening to allow the first space and the second space to communicate with each other;
   a partition to define and isolate a third space from the second space;
   an exhaust duct connected to the case, the exhaust duct in communication with the third space which is in fluid communication with the indoor space through an additional inlet provided on the bottom surface of the case;
   an air supply duct connected to the case to allow the case to communicate with an outdoor environment, the air supply duct in fluid communication with the first space;
   a fan vertically provided within the case over the air guide, the fan vertically and axially blowing in air from the first space and radially blowing out the drawn air into the second space; and
   an air purifying member provided within the second space, the air purifying member purifying the indoor air or the outdoor air introduced into the case,
   wherein the air purifying member is provided on an exhaust passage of the fan for maintaining a height of the case.

2. The ventilation system of claim 1, further comprising a louver opening the at least one inlet in a first mode, and closing the at least one inlet in a second mode.

3. The ventilation system of claim 1, further comprising a damper closing the air supply duct in a first mode, and opening the air supply duct in a second mode.

4. The ventilation system of claim 1, wherein the air purifying member is slantingly provided on the exhaust passage of the fan.

5. A ventilation system comprising:
   a case having at least one inlet, two outlets and an additional inlet communicating with an indoor space, the case being mounted on a ceiling of a room, the inlet, the additional inlet and the outlet being provided on a bottom surface of the case, and the inlet arranged between the two outlets;
   an air guide to enclose the inlet and define a first space therein and a second space thereout, the air guide having an opening to allow the first space and the second space to communicate with each other;
   a partition to define and isolate a third space from the second space;
   an air supply duct connected to the case to allow the case to communicate with an outdoor environment, the air supply duct in fluid communication with the first space;
   a fan vertically and axially blowing in air from the first space and radially the drawn air into the second space;
   an air purifying member installed within the second space, the air purifying member purifying the indoor air or the outdoor air introduced into the case;
   an exhaust duct connected to the case, the exhaust duct in fluid communication with the third space which is in fluid communication with the indoor space through the additional inlet; and
   a total heat exchanger arranged at the outside of the case, the total heat exchanger separately connected to the air supply duct and the exhaust duct to exchange heat between outdoor air flowing through the air supply duct and indoor air flowing through the exhaust duct, wherein the air purifying member is provided on an exhaust passage of the fan for maintaining a height of the case.

6. The ventilation system of claim 5, further comprising a louver opening the at least one inlet in a first mode for purifying the indoor air, and closing the at least one inlet in a second mode for ventilating the indoor air.

7. The ventilation system of claim 5, further comprising a damper closing the air supply duct in a first mode for purifying the indoor air, and opening the air supply duct in a second mode for ventilating the indoor air.

8. The ventilation system of claim 5, further comprising an exhaust fan configured to the outside of the case such that the indoor air is forcibly discharged to the outdoors via the exhaust duct.

9. A ventilation system comprising:
a case having at least one inlet, two outlets and an additional inlet communicating with an indoor space of a room, the case being mounted on a ceiling of a room, and the inlet, the additional inlet and the outlet being provided on a bottom surface of the case;
an air guide to enclose the inlet and define a first space therein and a second space thereout, the air guide having an opening to allow the first space and the second space to communicate with each other;
a partition to define and isolate a third space from the second space;
a fan placed over the air guide, the fan vertically and axially blowing in air from the first space and radially blowing out the drawn air into the second space;
two air purifiers installed within the second space, each of the air purifiers placed such that air is purified before being discharged through each of the outlets;
an exhaust duct connected to the case, the exhaust duct in fluid communication with the third space which is in fluid communication with the indoor space through the additional inlet; and
an exhaust fan configured to the outside of the case such that the indoor air is forcibly discharged to the outdoors via the exhaust duct,
wherein the air purifiers are provided on an exhaust passage of the fan for maintaining a height of the case.

10. The ventilation system of claim 9, further comprising a louver opening the at least one inlet in a first mode for purifying the indoor air, and closing the at least one inlet in a second mode for ventilating the indoor air.

11. The ventilation system of claim 9, further comprising a damper closing the air supply duct in a first mode for purifying the indoor air, and opening the air supply duct in a second mode for ventilating the indoor air.

12. The ventilation system of claim 9, further comprising a total heat exchanger configured to the outside of the case, the total heat exchanger separately connected to the air supply duct and the exhaust duct to exchange heat between outdoor air flowing through the air supply duct and indoor air flowing through the exhaust duct.

13. The ventilation system of claim 9, wherein the air purifiers are installed slantingly.

* * * * *